(12) United States Patent
Mestha et al.

(10) Patent No.: US 8,314,979 B2
(45) Date of Patent: Nov. 20, 2012

(54) COLOR MANAGEMENT METHODS AND SYSTEMS TO ADAPTIVELY TUNE COLORS FOR IMAGE MARKING DEVICES

(75) Inventors: Lalit Keshav Mestha, Fairport, NY (US); Matthew F. Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 974 days.

(21) Appl. No.: 12/274,980

(22) Filed: Nov. 20, 2008

(65) Prior Publication Data

US 2009/0296114 A1  Dec. 3, 2009

Related U.S. Application Data

(60) Provisional application No. 61/056,339, filed on May 27, 2008, provisional application No. 61/056,669, filed on May 28, 2008.

(51) Int. Cl.
*G03F 3/08* (2006.01)
*H04N 1/60* (2006.01)
*G06K 9/00* (2006.01)

(52) U.S. Cl. .......... 358/518; 358/1.9; 358/523; 382/167
(58) Field of Classification Search .................. None
See application file for complete search history.

(56) References Cited

U.S. PATENT DOCUMENTS

| | | | | |
|---|---|---|---|---|
| H1506 H | * | 12/1995 | Beretta | ............... 345/591 |
| 6,075,888 A | * | 6/2000 | Schwartz | ............... 382/167 |
| 6,157,469 A | | 12/2000 | Mestha | |
| 6,178,007 B1 | | 1/2001 | Harrington | |
| 6,744,531 B1 | | 6/2004 | Mestha et al. | |
| 6,791,716 B1 | * | 9/2004 | Buhr et al. | ............... 358/1.9 |
| 6,809,837 B1 | | 10/2004 | Mestha et al. | |
| 7,069,164 B2 | | 6/2006 | Viturro et al. | |
| 7,557,814 B2 | * | 7/2009 | Tin | ............... 345/590 |
| 8,023,156 B2 | * | 9/2011 | Mestha et al. | ............... 358/3.23 |
| 8,103,491 B2 | * | 1/2012 | Steenhoek | ............... 703/2 |
| 2002/0029715 A1 | * | 3/2002 | Ogatsu et al. | ............... 101/494 |
| 2002/0161659 A1 | * | 10/2002 | Veilleux et al. | ............... 705/26 |
| 2003/0001860 A1 | * | 1/2003 | Yamazaki et al. | ............... 345/590 |
| 2003/0091229 A1 | * | 5/2003 | Edge et al. | ............... 382/162 |
| 2003/0098986 A1 | * | 5/2003 | Pop | ............... 358/1.9 |
| 2005/0030560 A1 | | 2/2005 | Maltz et al. | |
| 2005/0100211 A1 | * | 5/2005 | Gibson et al. | ............... 382/162 |
| 2006/0244982 A1 | * | 11/2006 | Zeng | ............... 358/1.9 |
| 2006/0244983 A1 | * | 11/2006 | Zeng | ............... 358/1.9 |
| 2007/0035754 A1 | * | 2/2007 | Hori et al. | ............... 358/1.9 |
| 2007/0188780 A1 | * | 8/2007 | Edge | ............... 358/1.9 |
| 2007/0229862 A1 | * | 10/2007 | Derhak et al. | ............... 358/1.9 |
| 2008/0007748 A1 | * | 1/2008 | Borg et al. | ............... 358/1.9 |

(Continued)

OTHER PUBLICATIONS

U.S. Appl. No. 11/507,405, filed Aug. 21, 2006, Hancock et al.

(Continued)

*Primary Examiner* — Madelein A Nguyen
(74) *Attorney, Agent, or Firm* — Fay Sharpe LLP (57) ABSTRACT

Disclosed are color management methods and systems to adaptively tune colors for one or more image marking devices. Specifically, exemplary embodiments include methods and systems to create profiles for preference color matching. For example, Lab values associated with target node colors can be warped using a predefined function for special regions of interest.

22 Claims, 4 Drawing Sheets

U.S. PATENT DOCUMENTS

| | | | |
|---|---|---|---|
| 2008/0043263 A1* | 2/2008 | Hancock et al. | 358/1.9 |
| 2008/0088858 A1* | 4/2008 | Marcu et al. | 358/1.6 |
| 2009/0228955 A1* | 9/2009 | Gibson et al. | 726/1 |
| 2009/0296091 A1* | 12/2009 | Skinner et al. | 356/402 |
| 2009/0296107 A1* | 12/2009 | Mestha et al. | 358/1.9 |
| 2010/0149559 A1* | 6/2010 | Morales et al. | 358/1.9 |
| 2011/0044535 A1* | 2/2011 | Stevens | 382/162 |

OTHER PUBLICATIONS

U.S. Appl. No. 11/507,406, filed Aug. 21, 2006, Gil et al.
U.S. Appl. No. 12/127,643, filed May 27, 2008, Mestha et al.
U.S. Appl. No. 12/127,473, filed May 27, 2008, Wang et al.
U.S. Appl. No. 12/127,719, filed May 27, 2008, Gil et al.
U.S. Appl. No. 12/127,728, filed May 27, 2008, Matlz et al.

* cited by examiner

COLOR MANAGEMENT METHODS AND SYSTEMS TO ADAPTIVELY TUNE COLORS FOR IMAGE MARKING DEVICES

This application claims the priority benefit of U.S. provisional patent application Ser. No. 61/056,339, filed May 27, 2008 and U.S. provisional application Ser. No. 61/056,669, filed May 28, 2008, the disclosures of which are totally incorporated herein by reference.

To meet customer demands, image output devices such as a printer or display need to produce a consistent spectrum of colors over time. For example, customers want a printing system to produce a particular colored document consistently from day to day, or print job to print job.

Notably, the device profiling method discussed above can also be applied to a display where an image sensing device is approximately located to the display for colorimetric measurements of the displayed image. In addition, multiple LUTs may be generated for an image output device to account for multiple media types and/or half tone screens.

In this disclosure, provided are methods and systems to adapting tune memory colors for preference matching.

BACKGROUND

To meet customer demands, image output devices such as a printer or display need to produce a consistent spectrum of colors over time. For example, customers want a printing system to produce a particular colored document consistently from day to day, or print job to print job.

To control the color rendering consistency of a printing device, the printing device is typically characterized and calibrated prior to being shipped to a customer. The characterization process produces a set of LUTs (look-up tables) which correlate a standardized set of target colors with the appropriate device dependent color space values necessary to produce the target colors with the printing device. For example, a Pantone.RTM. color spectrum may be utilized as a color target reference and the LUTs produced by the characterization process are device dependent CMYK color space representations of the Pantone.RTM target colors. More commonly the target colors are selected based on transforming a uniformly sampled RGB grid to L*a*b* space using suitable RGB to L*a*b* transformation. The device dependent CMYK color space values are found for each of the nodes in the transformed L*a*b* space using Gray Component Replacement, inversion and gamut mapping algorithms. The characterization process is generally referred to as profiling a device or printer. The calibration process is used to build 1-dimensional tone reproduction curves and is carried out more frequently than the characterization process.

To accomplish the profiling of a printing device, a spectrophotometer or other image sensing device is used to measure the calorimetric properties of the produced images. These measured calorimetric properties provide an objective basis of comparison to the reference target color set and provide the necessary feedback to iteratively generate accurate device dependent LUTs.

Notably, the device profiling method discussed above can also be applied to a display where an image sensing device is approximately located to the display for calorimetric measurements of the displayed image. In addition, multiple LUTs may be generated for an image output device to account for multiple media types and/or half tone screens.

This disclosure relates to image output device color management methods and systems. Specifically, this disclosure provides methods and systems to create profiles for preference color matching.

INCORPORATION BY REFERENCE

U.S. patent application Ser. No. 11/507,405, entitled: "SYSTEM AND METHOD FOR AUTOMATED SPOT COLOR EDITOR," by Joseph D. Hancock et al., filed Aug. 21, 2006;

U.S. patent application Ser. No. 11/507,406, entitled: "SPOT COLOR CONTROLS AND METHOD," by Gil et al., filed Aug. 21, 2006;

U.S. Pat. No. 6,157,469, entitled "DYNAMIC DEVICE INDEPENDENT IMAGE CORRECTION METHOD AND APPARATUS," by Mestha, issued Dec. 5, 2000;

U.S. Pat. No. 6,178,007, entitled "METHOD FOR CONTINUOUS INCREMENTAL COLOR CALIBRATION FOR COLOR DOCUMENT OUTPUT TERMINALS," to Harrington, issued Jan. 23, 2001;

U.S. Pat. No. 6,744,531, entitled "COLOR ADJUSTMENT APPARATUS AND METHOD," to Mestha et al., issued Jun. 1, 2004;

U.S. Pat. No. 6,809,837, entitled "ON-LINE MODEL PREDICTION AND CALIBRATION SYSTEM FOR A DYNAMICALLY VARYING COLOR REPRODUCTION DEVICE," to Mestha et al., issued Oct. 26, 2004;

U.S. Pat. No. 7,069,164, entitled "METHOD FOR CALIBRATING A MARKING SYSTEM TO MAINTAIN COLOR OUTPUT CONSISTENCY ACROSS MULTIPLE PRINTERS," to Viturro et al., issued Jun. 27, 2006;

U.S. Patent Application Publication No. 2005/0030560, entitled "METHODS AND SYSTEMS FOR CONTROLLING OUT-OF-GAMUT MEMORY AND INDEX COLORS," to Maltz et al., published Feb. 10, 2005;

U.S. patent application Ser. No. 12/127,643, entitled "METHOD, APPARATUS AND SYSTEMS TO RETRIEVE GCRS FROM HISTORICAL DATABASE," to Mestha et al., filed May 27, 2008;

U.S. patent application Ser. No. 12/127,719, entitled "METHODS, APPARATUS AND SYSTEMS FOR BLENDING MULTIPLE GCRS," by Wang et al., filed May 27, 2008;

U.S. patent application Ser. No. 12/127,719, entitled "COOPERATIVE NEIGHBOR PRINTING SYSTEM PROFILE METHODS AND SYSTEMS," by Gil et al., filed May 27, 2008; and, U.S. patent application Ser. No. 12/127,728, entitled "PRINTER PROFILING METHODS, APPARATUS AND SYSTEMS FOR DETERMINING DEVICE AND GAIN MATRIX VALUES," to Maltz et al., filed May 27, 2008 are all hereby totally incorporated herein by reference.

BRIEF DESCRIPTION

In one exemplary embodiment of this disclosure, a method of color management for an imaging marking device is disclosed which comprises A) receiving a source color profile which includes a plurality of target colors represented as respective source device independent color space data representations; B) selecting a region of the source color profile for tuning, the region associated with a particular color rendered with the image marking device which is considered to be perceptually unacceptable; C) shifting the source device independent color space data representations associated with the selected region by a predetermined value, the predetermined value associated with a color shift of the region necessary to render the particular color with the image marking device in a perceptually acceptable manner; D) generating a preprocess color profile for the image marking device by tuning the source device independent color space data representations associated with the selected region to the shifted device independent color space data representations associated with the selected region; and E) generating a destination color profile for the image marking device by associating the device independent color space data representations of the preprocessors color profile with respective device dependent color space data representations for rendering the plurality of target colors with the image marking device.

In another exemplary embodiment of this disclosure, a computer program product is disclosed. The computer product comprises a computer-usable data carrier storing instructions that, when executed by a computer, cause the computer to perform a method of generating a destination color profile for an image marking device comprising A) receiving a source color profile which includes a plurality of target colors represented as respective source device independent color space data representations; B) selecting a region of the source color profile for tuning, the region associated with a particular color rendered with the image marking device which is considered to be perceptually unacceptable; C) shifting the source device independent color space data representations associated with the selected region by a predetermined value, the predetermined value associated with a color shift of the region necessary to render the particular color with the image marking device in a perceptually acceptable manner; D) generating a preprocess color profile for the image marking device by tuning the source device independent color space data representations associated with the selected region to the shifted device independent color space data representations associated with the selected region; and E) generating a destination color profile for the image marking device by associating the device independent color space data representations of the preprocessors color profile with respective device dependent color space data representations for rendering the plurality of target colors with the image marking device.

In still another exemplary embodiment of this disclosure, a printing system is disclosed which comprises one or more image marking devices;

a controller operatively connected to the one or more image marking devices, the controller configured to access one or more color profiles for the one or more image marking devices, wherein the color profiles are generated according to the method of claim 1.

DETAILED DESCRIPTION

Many natural scenes or objects show color recognition, for example, skies always appear blue.

As discussed in the Background, advanced Profiling technology is designed to produce accurate color rendition. Consequently, profiling methods have a tendency to produce purple skies which are not always preferred by customers. Typically, blue skies are more preferred than purple skies. Similarly memory colors of familiar objects (e.g., grass) should be reproduced in their original form. In short, in many cases, non-accurate rendering of the source file is preferred where the skies are printed with more cyan than the RGB calls would indicate.

In this disclosure, shown are methods and systems to adaptively tune memory colors for preference matching during a profile creation stage. According to exemplary embodiments thereof, preference LUTs are not built. In contrast, familiar L*a*b* values of the node colors are warped using a predefined function for special regions of interest. For example, an interactive GUI (Graphical User Interface) based slider, such as a pre-LUT, is incorporated for the customer to manually set the amount of warping to induce color shifts towards the direction suitable for creating original/desired colors. The focus of the node warping is on out of gamut or edge of gamut RGB values, as these are the colors where pure accurate reproduction on a printer may not be possible and preference adjustments are typically more acceptable or desired.

Substantively, a multi-dimensional L*a*b*→L*a*b* transform, called a pre-LUT, with a slider to control the amount of color shift is used to bias the colors towards the desired direction. The pre-LUT uses R, G and B sliders and the sliders provide the user with the ability to select the amount of warping to be applied to the RGB colors, which then transforms into a multi-dimensional Look-Up Table. This table is applied as a pre-LUT to a destination profile LUT. Both LUTs are then concatenated to create a final destination profile which provides a means of warping preformed colors.

Figure 3:
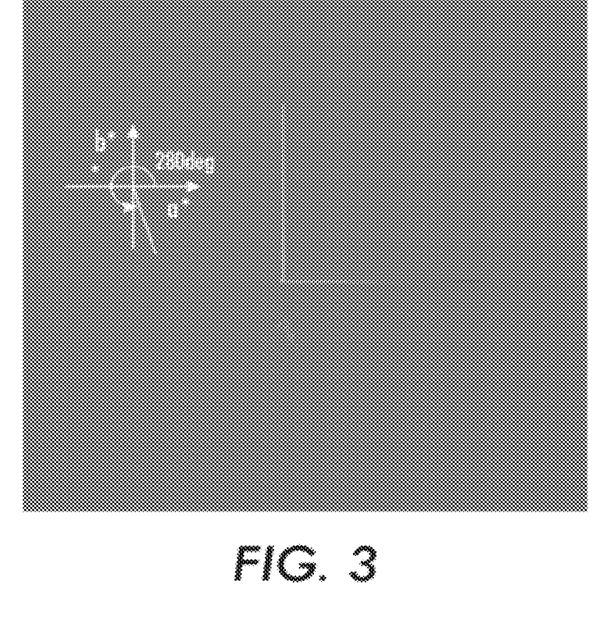
FIG. 3 illustrates actual sky colors shown on a chroma plane.
Figure 4:
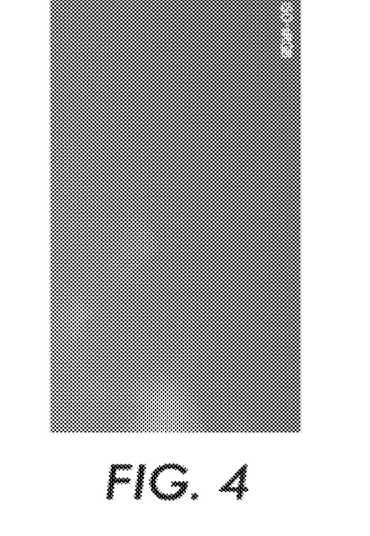
FIG. 4 is a black and white representation of sky colors appearing purplish when printed.

To accurately quantify the amount of shift given to each key region of the memory color, the disclosed exemplary methods and systems comprise the following steps:

(A) First a suitable region is identified for tuning the colors. For example, sky colors are generally centered around 280 degree hue angle. FIG. 3 shows the location of typical sky colors with respect to chroma plane and FIG. 4 shows a sky rendered in black and white.

Figure 5:
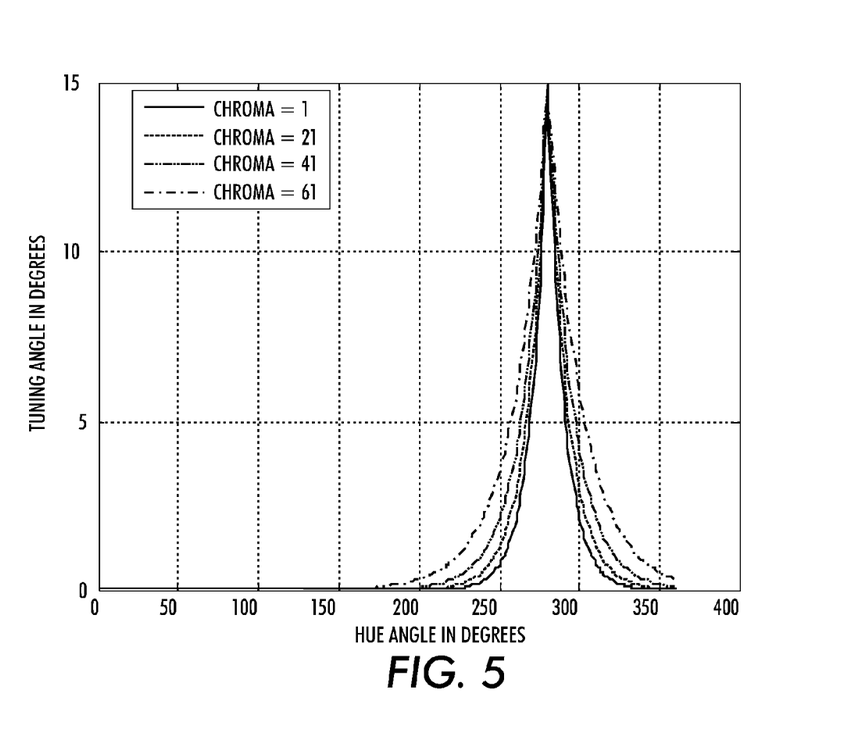
FIG. 5 illustrates an example of the disclosed tuning function used for adjusting sky colors.

(B) Second, a parameterized mathematical function is constructed for the hue shift which is a function of the hue and chroma. Parameters are then set based on the amount of tuning needed by the user. An example of the function for tuning sky colors is shown in FIG. 5. This function is drawn with respect to hue angle and chroma. The mathematical form of this function is shown in Equation 1 below.

$$\Delta\psi=\Delta\psi_{sky}e^{-\alpha(\psi_{sky}-\psi)} \text{ for } 0\leq\psi\leq\psi_{sky} \qquad (1)$$

Where $\psi_{sky}$ is the average hue angle of the sky colors (e.g., $\psi_{sky}$=280 deg)

$\Delta\psi_{sky}$ is the maximum hue shift (e.g. $\Delta\psi_{sky}$=15 deg $\psi$ is the hue angle of the node color $\alpha$ is the coefficient of exponential, which is modeled as a linear function of chroma as follows in equation 2.

$$\alpha=\alpha_0+m\,c \qquad (2)$$

Where, $\alpha_0$ is the coefficient of the exponential hue function at zero chroma (e.g., $\alpha_0$=0.1)

$\alpha_{low}$ is the low value of $\alpha$ (e.g., $\alpha_{low}$=0.4$\alpha_0$)

c is the chroma $c_{max}$ is the maximum chroma (e.g., $c_{max}=70$)
m is the slope which is obtained from equation 3 below.

$$m = -\frac{\alpha_0 - \alpha_{low}}{c_{max}} \quad (3)$$

A mirror image of equation 1 is used for nodes with hue angle between $\psi_{sky}$ and 0 (i.e., $\psi_{sky} \leq \psi \leq 0$).

(C) Third, hue angles of the look up table nodes are adjusted by shifting to new hue angle as follows $$\psi_n = \psi - \Delta\psi \quad 4)$$

(D) Finally, as part of the adaptive tuning procedure, the parameters can then be tuned by creating several profiles with different values of tuning function.

An ICC profile is constructed for the exemplary embodiments of this disclosure for the parameters of the tuning function shown in equations 1 to 3.

A similar function can be used for tuning grass colors, hair, reds, fruit, and other memory colors where non-accurate rendering is more preferred over accurate rendering (e.g., Strawberries printed as a strong bright red are preferred to darker reds or magenta reds, even if the original image was too dark or too magenta). A localized function of the type described in equation 1 can be used to tune other memory colors.

To provide a better understanding of the disclosed method and embodiments thereof, provided below is a more detailed description of printer profiling and a description of how it relates to tuning selected regions.

The ICC (International Color Consortium) was set up to provide a standard architecture for color management. A source profile is assigned to each image file which defines a mathematical transform between the numbers in the input file (i.e. the amount of red, green and blue light seen by the source camera), and the appearance of the color to the human eye, described in XYZ or L*a*b* color spaces. These L*a*b* or XYZ values are passed to the destination profile, which defines a mathematical transform between them and the amounts of the colorants the destination device would need to produce the color. In the most general formulation, these mathematical transformations are multidimensional lookup tables. The destination profiles must also handle requests for colors the destination device cannot make (Gamut mapping). Using this architecture, source and destination devices from different vendors can be used in a system with good results.

From a technical perspective, a profile contains a multidimensional color correction lookup table (LUT) comprising a series of nodes in input color space (L*a*b* or XYZ), and device-specific (CMYK) output values stored at each node. When the input pixels to be corrected coincide with the nodes of the LUT, the corresponding device-specific color values are retrieved directly from LUT. If the pixels are not on the node, then they are derived via interpolation of neighboring nodes using a standard technique such as tetrahedral interpolation.

The first step in building a profile is to derive a forward characterization model that maps device-specific (CMYK) representation to visual (L*a*b*) color representation. The traditional technique is based on a spectral cellular Yule-Nielsen-corrected Neugebauer model (SCYNN).

The next step in the profiling process is to invert the aforementioned printer model to produce a mapping from a visual (L*a*b*) representation to a device-specific (CMYK) representation that produces smooth, contour-free, noise-free and pleasing image prints. The inversion approach can be executed either directly on the printer or by iterating on the printer model.

Next, there may exist colors in an image that are outside the gamut of colors reproducible by the printer. Accordingly, out-of-gamut colors are mapped to in-gamut colors.

In addition to the above, this disclosure implements a preprocessing LUT (prelut), which is an L*a*b* to L*a*b* transformation that is used to modify the response of the printer to get prints that are, on the average, more preferred. It is called a prelut because, conceptually, it comes before the transformations in the image path that compensate for printer variability and drift. It contains two components: a) a set of TRCs for compensating for color casts, and b) a multidimensional lookup table for mapping input to the output LAB in a flexible way. The prelut can be produced by a module with an intuitive graphical user interface. The TRCs are shaped by moving four control points to obtain smooth transformations. The multidimensional lookup table is created by specifying the desired changes in the desired regions of color space.

The region of color space to be modified can be specified either by name ("red but not pink") or by selecting a region of a sample image that contains the colors the user wishes to modify. The software determines the region of color space to be modified by analyzing the colors in the selected region of the image.

The change can be specified either by using three sliders to set the new L*a*b*, or choosing a characteristic to change from a pull-down menu ("lightness," "contrast," "reddishness," etc.), and the amount of the change by moving a slider. Several trial images can be generated to simulate the effect of several changes. When the best is accepted, it then becomes the base image to which additional changes can be made.

Figure 1:
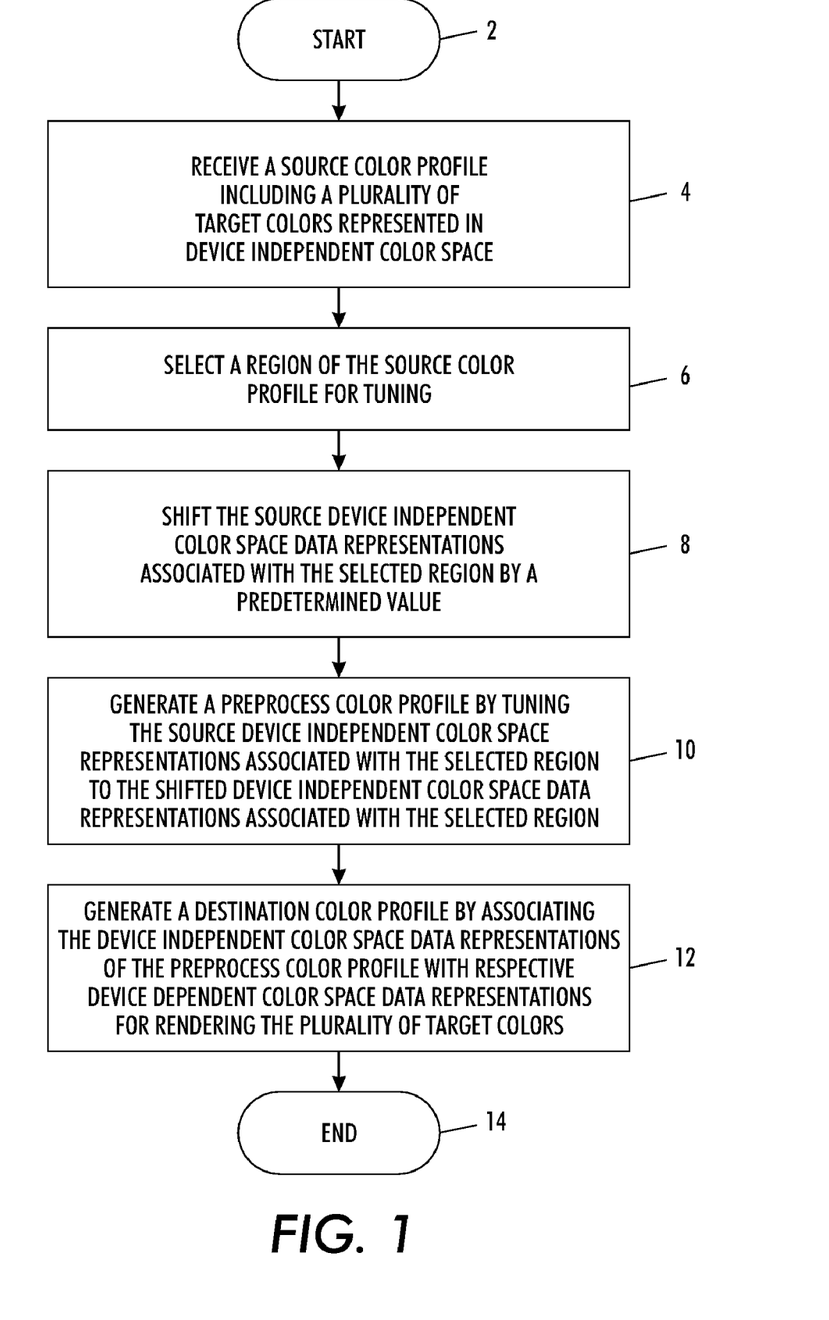
FIG. 1 is a flow chart illustrating an exemplary method of color management for an image marking device according to an embodiment of this disclosure.

With reference to FIG. 1, illustrated is a flow chart of a method of color management for an image marking according to an exemplary embodiment of this disclosure.

Initially, method starts at block 2.

Next, at block 4, a source color profile is received, the source color profile including a plurality of target colors represented in device independent color space, for example, L*a*b*.

Next, at block 6, a user selects a region of the source color profile for tuning. For example, a user may visually inspect the region colors by means of a GUI and select a region by means of the GUI.

Next, at block 8, the process shifts the source device independent color space data representations associated with the user selected region be a predetermined value. For example, the predetermined value can be the result of the user operating a slider control via the GUI.

Next, at block 10, the process generates a preprocess color profile by tuning the source device independent color space representations associated with the user selected region to the shifted device independent color space data representations associated with the selected region. For example, at block 10, a preprocess multidimensional LUT is generated to transform the source color profile to the preprocess device independent color space representations associated with the selected region.

Next, at block 12, the process generates a destination color profile by associating the device independent color space data representations of the preprocess color profile with respective devices dependent color space data representations for rendering the plurality of target colors.

Finally, at block 14, the process ends.

Figure 2:
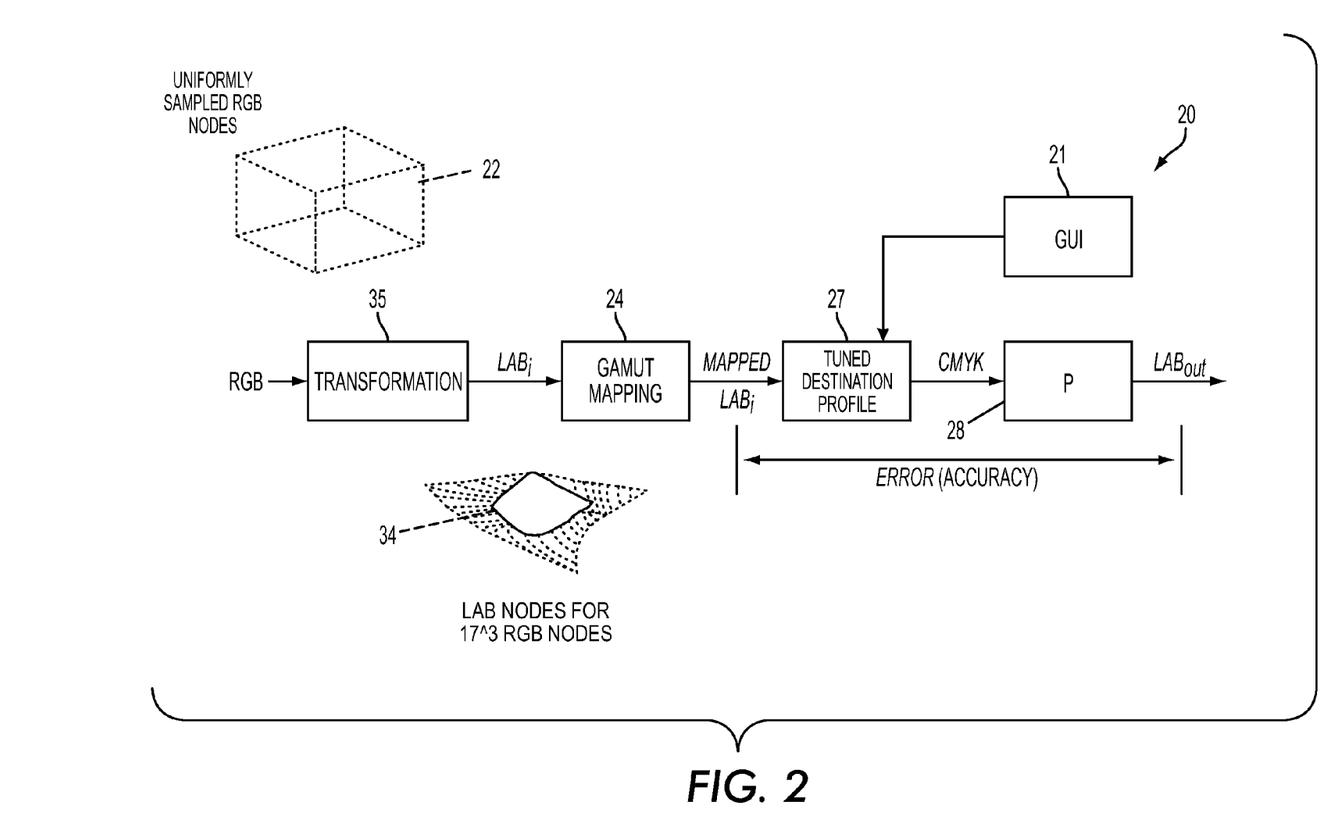
FIG. 2 is a block diagram of an exemplary control system for color management of one or more image marking devices according to an embodiment of this disclosure.

With reference to FIG. 2, illustrated is a block control diagram of an exemplary control system for color management of one or more marking devices according to this disclosure.

The color management control system diagram shows the image path associated with generating a destination color profile, i.e., LAB to CMYK or a printer/printer model 28 which outputs LAB out.

As previously discussed in this disclosure, to generate a color profile for printer P 28, a uniformly sampled set of nodes 22, represented in RGB 34, are transformed 35 to a device independent color space, i.e., LAB. Then a gamut mapping process 24 is performed to map printer out-of-gamut colors to in-gamut colors, represented in device independent color space LAB.

At this point in the process, a destination color profile is created to transform the mapped LAB values to device dependent color space, i.e., CMYK. The destination color profile is created according to the color management processes described with references to FIG. 1. Specifically, a user interfaces with a GUI to tune one or more selected regions of the mapped LAB color space to preferred LAB values for rendering.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of color management for an image marking device comprising:
   A) receiving a source color profile which includes a plurality of target colors represented as respective source device independent color space data representations;
   B) selecting a region of the source color profile for tuning, the region associated with a particular color rendered with the image marking device which is considered to be perceptually unacceptable;
   C) shifting the source device independent color space data representations associated with the selected region by a predetermined value, the predetermined value associated with a color shift of the region necessary to render the particular color with the image marking device in a perceptually acceptable manner and the predetermined value calculated according to a parameterized exponential mathematical function;
   D) generating a preprocess color profile for the image marking device by tuning the source device independent color space data representations associated with the selected region to the shifted device independent color space data representations associated with the selected region; and
   E) generating a destination color profile for the image marking device by associating the device independent color space data representations of the preprocess color profile with respective device dependent color space data representations for rendering the plurality of target colors with the image marking device.

2. The method according to claim 1, wherein the source color profile transforms target colors represented in one of RGB and sRGB to one of CIE Lab and CIE XYZ.

3. The method according to claim 2, wherein the destination color profile generated in step E) transforms the device independent color space data representations of the preprocess color profile to respective device dependent color space data represented as one of CMY and CMYK.

4. The method according to claim 1, wherein the region selected in step B) includes one or more of sky colors, grass colors, hair colors, red colors and fruit colors.

5. The method according to claim 1, wherein step C) shifts hue associated with the selected region by the predetermined value calculated according to the parameterized exponential mathematical function:

$$\Delta\psi = \psi_{selected} e^{-\alpha(\psi_{selected}-\psi)} \text{ for } 0 \leq \psi \leq \psi_{selected},$$

where
$\psi_{selected}$ is an average hue angle of the selected region colors;
$\psi$ is a hue angle of a node color;
$\alpha$ is a coefficient of exponential, which is modeled as a linear function of chroma as $\alpha = \alpha_0 + mc$;
$\alpha_0$ is a coefficient of the exponential hue function at zero chroma;
$\alpha_{low}$ is a low value of $\alpha$;
c is chroma;
$c_{max}$ is a maximum chroma;
m is a slope which is obtained from the equation:

$$m = -\frac{\alpha_0 - \alpha_{low}}{c_{max}};$$

a mirror image of $\Delta\psi = \Delta\psi_{selected} e^{-\alpha(\psi_{selected}-\psi)}$ for $0 \leq \psi \leq \psi_{selected}$ is used for nodes with hue angle between $\psi_{selected}$ and 0 (i.e., $\psi_{selected} \leq \psi \leq 0$); and
hue angles of the nodes are adjusted by shifting to a new hue angle according to:

$$\psi_n = \psi - \Delta\psi.$$

6. The method according to claim 1, wherein the region selected in step B) is associated with one or more of a range of colors, a plurality of colors, a plurality of independent regions and two or more overlapping regions.

7. The method according to claim 1, wherein the source color profile and destination color profile are multidimensional LUTs (look-up tables) and step D) generates a preprocess multidimensional LUT to transform the source color profile to the preprocess device independent color space representations associated with the selected regions.

8. The method according to claim 1, wherein the predetermined value is a hue shift determined as a function of the hue angle attributed to the selected region.

9. The method according to claim 1, wherein an operator provides inputs to one or more of select the region of step C) and provide the predetermined value of step C).

10. The method according to claim 1, wherein the destination color profile is one of stored on a computer usable memory device, communicated to a data receiving device, and further processed.

11. A non-transitory computer program product comprising:
   a computer-usable data carrier storing instructions that, when executed by a computer, cause the computer to perform a method of generating a destination color profile for an image marking device comprising:
   A) receiving a source color profile which includes a plurality of target colors represented as respective source device independent color space data representations;

B) selecting a region of the source color profile for tuning, the region associated with a particular color rendered with the image marking device which is considered to be perceptually unacceptable;

C) shifting the source device independent color space data representations associated with the selected region by a predetermined value, the predetermined value associated with a color shift of the region necessary to render the particular color with the image marking device in a perceptually acceptable manner and the predetermined value calculated according to a parameterized exponential mathematical function;

D) generating a preprocess color profile for the image marking device by tuning the source device independent color space data representations associated with the selected region to the shifted device independent color space data representations associated with the selected region; and E) generating a destination color profile for the image marking device by associating the device independent color space data representations of the preprocessors color profile with respective device dependent color space data representations for rendering the plurality of target colors with the image marking device.

12. The computer program product according to claim 11, wherein the source color profile transforms target colors represented in one of RGB and SRGB to one of CIE Lab and CIE XYZ.

13. The computer program product according to claim 11, wherein the destination color profile generated in step E) transforms the device independent color space data representations of the preprocess color profile to respective device dependent color space data represented as one of CMY and CMYK.

14. The computer program product according to claim 11, wherein the region selected in step B) includes one or more of sky colors, grass colors, hair colors, red colors and fruit colors.

15. The computer program product according to claim 11, wherein step C) shifts hue associated with the selected region by the predetermined value calculated according to the parameterized exponential mathematical function:

$$\Delta\psi = \psi_{selected} e^{-\alpha(\psi_{selected}-\psi)} \text{ for } 0 \leq \psi \leq \psi_{selected},$$

where $\psi_{selected}$ is an average hue angle of the selected region colors;

$\psi$ is a hue angle of a node color;

$\alpha$ is a coefficient of exponential, which is modeled as a linear function of chroma as $\alpha = \alpha_0 + mc$;

$\alpha_0$ is a coefficient of the exponential hue function at zero chroma;

$\alpha_{low}$ is a low value of $\alpha$;

c is chroma;

$c_{max}$ is a maximum chroma;

m is a slope which is obtained from the equation:

$$m = -\frac{\alpha_0 - \alpha_{low}}{c_{max}};$$

a mirror image of $\Delta\psi = \Delta\psi_{selected} e^{-\alpha(\psi_{selected}-\psi)}$ for $0 \leq \psi \leq \psi_{selected}$ is used for nodes with hue angle between $\psi_{selected}$ and 0 (i.e., $\psi_{selected} \leq \psi \leq 0$); and hue angles of the nodes are adjusted by shifting to a new hue angle according to:

$\psi_n = \psi - \Delta\psi.$

16. The computer program product according to claim 11, wherein the region selected in step B) is associated with one or more of a range of colors, a plurality of colors, a plurality of independent regions and two or more overlapping regions.

17. The computer program product according to claim 11, wherein the source color profile and destination color profile are multidimensional LUTs (look-up tables) and step D) generates a preprocess multidimensional LUT to transform the source color profile to the preprocess device independent color space representations associated with the selected regions.

18. The computer program product according to claim 11, wherein the predetermined value is a hue shift determined as a function of the hue angle attributed to the selected region.

19. A printing system comprising:
one or more image marking devices;
a controller operatively connected to the one or more image marking devices, the controller configured to access one or more color profiles for the one or more image marking devices, wherein the color profiles are generated according to the method of claim 1.

20. The printing system of claim 19, wherein each image marking device is associated with a respective destination color profile, and the controller is configured to access the respective destination color profile for an image marking device to render an input image on the respective image marking device.

21. The printing system of claim 19, further comprising:
a GUI (Graphical User Interface) operatively connected to the controller, wherein an operator provides inputs to the GUI to one or more of select the region of step C) and provide the predetermined value of step C).

22. The printing system of claim 19, wherein the source color profile transforms target colors represented in RGB to Lab, a preprocess profile transforms the Lab values of the source color profile to the respective shifted device independent color space data representations associated with the select region, and the destination color profile transforms Lab values from one or both of the source color profile and preprocess profile to device dependent colorant amounts for rendering an image on the image marking device.

* * * * *